United States Patent
Goodwin, III (10) Patent No.: US 9,633,346 B2
(45) Date of Patent: Apr. 25, 2017

(54) FLEXIBLE FINANCIAL SERVICES TERMINAL AND METHODS OF OPERATION

(71) Applicant: John C. Goodwin, III, Suwanee, GA (US)

(72) Inventor: John C. Goodwin, III, Suwanee, GA (US)

(73) Assignee: NCR Corporation, Duluth, GA (US)

(*) Notice: Subject to any disclaimer, the term of this patent is extended or adjusted under 35 U.S.C. 154(b) by 35 days.

(21) Appl. No.: 13/853,139

(22) Filed: Mar. 29, 2013

(65) Prior Publication Data

US 2014/0297436 A1    Oct. 2, 2014

(51) Int. Cl.

| | |
|---|---|
| *G06G 1/12* | (2006.01) |
| *G06Q 40/00* | (2012.01) |
| *G06Q 20/20* | (2012.01) |
| *G06Q 40/02* | (2012.01) |
| *G06Q 20/10* | (2012.01) |
| *G07F 19/00* | (2006.01) |
| *G06Q 20/08* | (2012.01) |
| *G06Q 20/18* | (2012.01) |

(52) U.S. Cl.
CPC ....... *G06Q 20/202* (2013.01); *G06Q 20/0855* (2013.01); *G06Q 20/1085* (2013.01); *G06Q 20/18* (2013.01); *G06Q 40/02* (2013.01); *G07F 19/20* (2013.01)

(58) Field of Classification Search
USPC .............................................. 705/21, 35, 41
See application file for complete search history.

(56) References Cited

U.S. PATENT DOCUMENTS

| | | | | |
|---|---|---|---|---|
| 6,547,132 B1* | 4/2003 | Templeton | ........... | G06K 7/0004 235/379 |
| 6,676,016 B1* | 1/2004 | Coskrey, IV | .......... | G06Q 20/14 235/375 |
| 6,695,204 B1* | 2/2004 | Stinson | .................. | G06Q 20/18 235/375 |
| 7,349,884 B1* | 3/2008 | Odom | .................. | G06Q 20/042 705/40 |
| 7,529,687 B1* | 5/2009 | Phan | .................... | G06Q 20/201 705/14.67 |
| 7,970,650 B2* | 6/2011 | Tokorotani | ........... | G06Q 20/204 361/27 |
| 2002/0138431 A1* | 9/2002 | Antonin | ............... | G06Q 20/108 705/42 |

(Continued)

*Primary Examiner* — Ashford S Hayles
(74) *Attorney, Agent, or Firm* — Peter H. Priest; Schwegman, Lundberg & Woessner (57) ABSTRACT

A flexible financial services terminal and methods of operation is presented. The flexible financial services terminal provides a list of financial services to a customer. The customer selects a financial service and provides requested information related to the selected financial service. After the customer information is entered, a cashier trained in money transfers is called to the terminal to review the information and approve the financial service. Each financial service approved by the cashier is processed by the terminal and a fee is charged to the customer. The terminal further performs a purchase transaction that includes the fee for the financial service and receives payment from the customer for the purchase.

22 Claims, 7 Drawing Sheets

(56) References Cited

U.S. PATENT DOCUMENTS

| | | | | |
|---|---|---|---|---|
| 2003/0023555 A1* | 1/2003 | Rees | G06Q 20/042 | 705/44 |
| 2004/0122754 A1* | 6/2004 | Stevens, III | G06Q 20/042 | 705/35 |
| 2004/0176972 A1* | 9/2004 | Baba | G06Q 10/02 | 705/26.1 |
| 2004/0205023 A1* | 10/2004 | Hafer | G06Q 20/04 | 705/43 |
| 2004/0220876 A1* | 11/2004 | Liu | G06Q 20/40 | 705/44 |
| 2005/0080697 A1* | 4/2005 | Foss | G07F 7/1008 | 705/35 |
| 2006/0108414 A1* | 5/2006 | Sorenson | G06Q 20/18 | 235/381 |
| 2006/0167794 A1* | 7/2006 | Crowell | G06Q 20/10 | 705/40 |
| 2007/0075129 A1* | 4/2007 | Hanna | G06Q 20/10 | 235/379 |
| 2007/0244778 A1* | 10/2007 | Bailard | G06Q 40/00 | 705/35 |
| 2007/0288370 A1* | 12/2007 | Konja | G06Q 20/10 | 705/41 |
| 2008/0083826 A1* | 4/2008 | Henry | G06Q 20/10 | 235/379 |
| 2008/0191008 A1* | 8/2008 | Manfredi | G06Q 30/06 | 235/379 |
| 2008/0301049 A1* | 12/2008 | Dyson | A61K 31/47 | 705/42 |
| 2009/0063342 A1* | 3/2009 | Beckers | G06Q 20/105 | 705/41 |
| 2009/0076934 A1* | 3/2009 | Shahbazi | G06Q 20/102 | 705/30 |
| 2009/0177570 A1* | 7/2009 | Mehta | G06Q 20/04 | 705/35 |
| 2010/0042540 A1* | 2/2010 | Graves | G06Q 20/02 | 705/40 |
| 2010/0044430 A1* | 2/2010 | Song | G06Q 20/04 | 235/379 |
| 2010/0217697 A1* | 8/2010 | MacGuire | G06Q 20/10 | 705/34 |
| 2011/0054677 A1* | 3/2011 | Liddell | G06Q 10/06 | 700/236 |
| 2011/0155799 A1* | 6/2011 | Meszaros | G06Q 20/02 | 235/379 |
| 2012/0036069 A1* | 2/2012 | Silvestre | G06Q 20/10 | 705/42 |
| 2012/0203572 A1* | 8/2012 | Christensen | G06Q 30/02 | 705/3 |
| 2012/0284182 A1* | 11/2012 | Beckers | G06Q 20/105 | 705/41 |
| 2013/0006785 A1* | 1/2013 | Perkins | G06Q 20/027 | 705/18 |
| 2013/0054391 A1* | 2/2013 | Hipolito | G06Q 20/20 | 705/17 |
| 2014/0008431 A1* | 1/2014 | Patel | G07F 19/202 | 235/379 |

* cited by examiner

FIG. 5

FLEXIBLE FINANCIAL SERVICES TERMINAL AND METHODS OF OPERATION

FIELD OF THE INVENTION

The present invention relates to computer terminals that provide financial services and more specifically to computer terminals that process financial transactions and provide the flexibility to be operated by a customer and a trained cashier during each financial transaction.

BACKGROUND

A growing service provided by retailers is the ability for a customer to perform financial transactions not specifically related to a purchase transaction. The financial services are provided as a convenience to the customer and the retailers typically charge fees for the services. Financial services that involve money transfers are controlled by government statutes and regulations that place restrictions on the transfers and impose severe civil and criminal penalties on violators, including the party that allows the transaction. As such, retailers typically require that a cashier trained in financial services review and approve certain financial services before the financial service can be completed.

Retailers provide a dedicated customer terminal that customers use to start a financial transaction associated with a financial service. A customer uses the customer terminal to enter basic information needed to process the financial transaction and then is given a printed receipt that includes indicia identifying the customer entered information. The customer may also deposit money into the terminal if it is required as part of the transaction. The customer is then directed to another terminal operated by a cashier. The customer presents their receipt to the cashier and the cashier uses the receipt to access and review the information entered by the customer. If the cashier approves the information, the transaction is completed. If the cashier does not approve the information, the transaction is rejected and money deposited by the customer is refunded. This process requires two different computer terminals, each with a number of expensive peripherals.

SUMMARY

Among its several aspects, the present invention seeks to overcome or ameliorate at least one of the disadvantages of the prior art, or to provide a useful alternative.

In accordance with the teachings of the present invention, a single financial services terminal is provided for processing financial transactions associated with different financial services. The financial services terminal interacts with a customer and with a cashier trained in the regulations governing financial services including money transfers. Additionally, the financial services terminal communicates with a point-of-sale store server computer to process purchase transactions and with external server computers to process financial transactions. The financial services terminal further processes purchase transactions for customers that include fees that are charged for performing financial services.

Among its several aspects, the present invention recognizes there is an advantage to performing both financial transactions and purchase transactions in one financial services terminal. The advantages include cost savings because only one terminal is required to perform both types of transactions. In addition, the financial services terminal communicates with the point-of-sale store server computer to report information on all purchase transactions and financial transactions. This information is then integrated into the store's digital general ledger and merchandise management systems.

Among its several aspects, the present invention recognizes there is an advantage to a customer selecting a financial service, entering information required for the service and then having the information reviewed and approved by a cashier before the service is processed. The cashier is trained in the regulations associated with the financial services and may require additional information from the customer or require that certain parameters related to the service be modified before the service can be approved. Having a trained cashier review the information provided by the customer provides an extra level of fraud protection.

In accordance with an embodiment of the present invention, there is provided a method implemented by a financial services terminal to perform a financial transaction for a customer. The method comprising: receiving information related to the financial transaction from the customer located at the financial services terminal; displaying the received information to a cashier located at the financial services terminal; receiving information related to the financial transaction from the cashier located at the financial services terminal; transmitting, in response to receiving the information from the cashier, information related to the financial transaction to an external server computer with a request to process the financial transaction; and processing a purchase transaction for the customer that includes a fee charged to perform the financial transaction.

A more complete understanding of the present invention, as well as further features and advantages of the invention, will be apparent from the following Detailed Description and the accompanying Drawings.

BRIEF DESCRIPTION OF THE DRAWINGS

The present invention may take form in various components and arrangement of components and in various methods. The drawings are only for purposes of illustrating example embodiments and alternatives and are not to be construed as limiting the invention. The drawings are not necessarily drawn to scale. Throughout the drawings, like element numbers are used to describe the same parts throughout the various drawings, figures and charts.

DETAILED DESCRIPTION

In the following description, numerous details are set forth to provide an understanding of the claimed invention.

However, it will be understood by those skilled in the art that aspects of the claimed invention may be practiced without utilizing all of these details and that numerous variations or modifications from the described embodiments are possible and envisioned.

Figure 1:
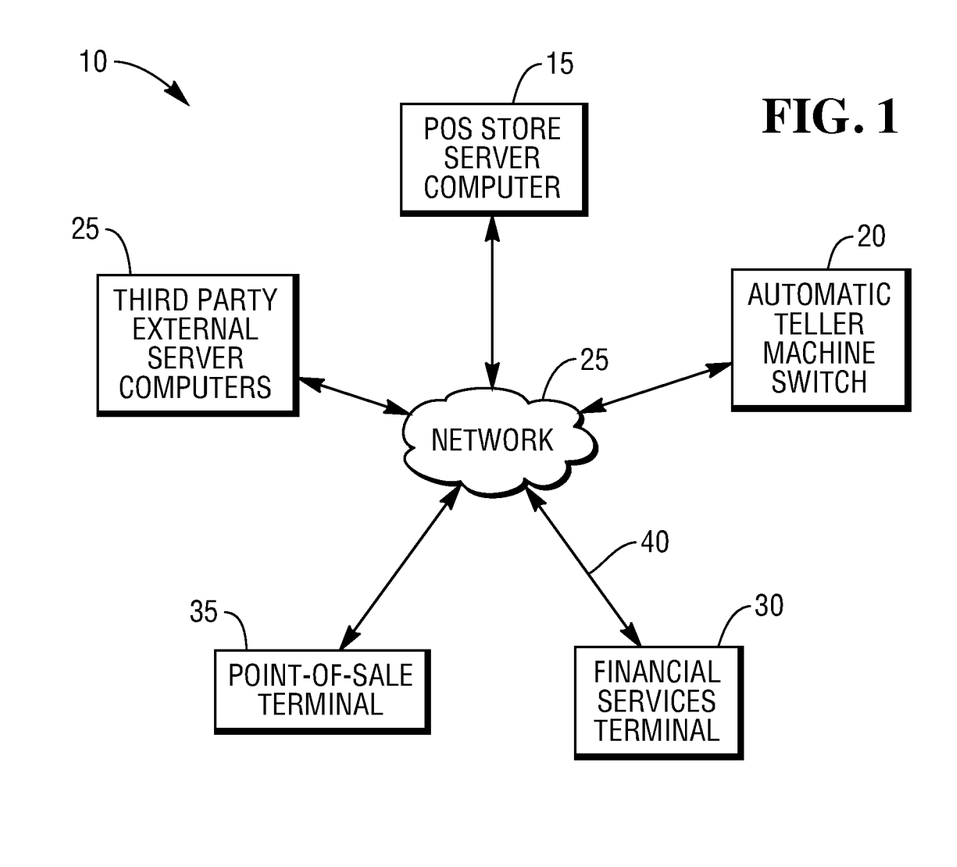
FIG. 1 is a high-level block diagram illustrating a financial services system of the present invention.

With reference to FIG. 1, there is provided a high-level block diagram illustrating a financial services system 10 including a financial services terminal 30 that uses a network 25 to communicate with a point-of-sale (POS) store server computer 15, an automatic teller machine switch 20, and one or more third party server computers 25. The financial services system 10 further includes one or more POS terminals 35 that communicate over the network 25 with the POS store server computer 15.

The POS terminals 35 may suitably include self-service and assisted service terminals that perform purchase transactions for customers. The POS terminals 35 are located within a store and communicate with the POS store server computer 15 to perform the purchase transaction. The POS store server computer 15 maintains information on all purchase transactions and financial transactions. Additionally, the POS store server computer 15 provides point-of-sale functions to the POS terminals 35 and the financial services terminal 30. The POS store server computer 15 may suitably include one or more computers and may suitably be located within the store or remotely from the store or a combination of both when multiple computers are used to provide the function.

The automatic teller machine (ATM) switch 20 is a digital network switch that acts as a gateway to financial server computers that provide financial transactions typically available at an automatic teller machine. The ATM transactions may suitably include but are not limited to: currency withdrawals, deposits, reports, account balances and the transfer of funds. The financial services terminal 30 communicates with the financial server computers using the ATM switch 20 to provide the ATM transactions as a financial service to customers. The financial services terminal 30 communicates with the ATM switch 20 using the network 25.

The third party server computers 25 include one or more server computers that are operated by one or more third parties. The third party server computers 25 provide financial transactions related to the third party that may suitably include paying bills, money transfers, money orders and the like. Each of the third party server computers 25 executes software that performs the financial transactions. The financial services terminal 30 communicates with the third party server computers 25 to provide the financial transactions as a financial service to customers.

The network 25 may suitably include a network which uses a communications protocol based on transmission control protocol/internet protocol (TCP/IP). The network 25 may suitably include a combination of local area and wide area networks. The network 25 may suitably include any combination of wireless or wired networks. The network 25 may suitably include a combination of private and public networks, including a global communication network, also known as the Internet. The term cloud based server is sometimes used and refers to a remote computer server accessed over a public network, such as the Internet.

Figure 2A:
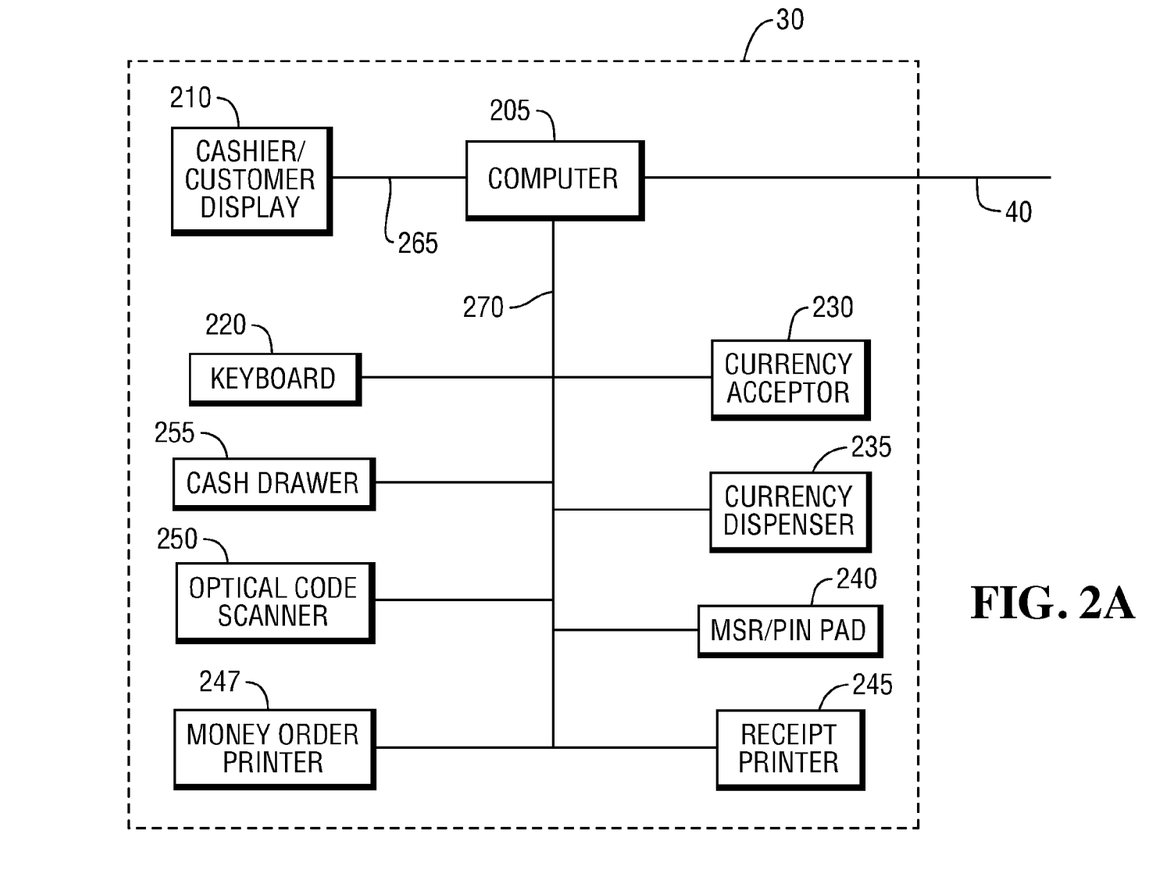
FIG. 2A is a high-level block diagram illustrating selected hardware components of one embodiment of a financial services terminal of the present invention.

Turning now to FIG. 2A, there is provided a high-level block diagram illustrating selected hardware components of one embodiment of the financial services terminal 30. The financial services terminal 30 may suitably include a computer 205, a cashier/customer display 210, a keyboard 220, a cash drawer 255, a scanner 250, a receipt printer 245, a money order printer 247, a currency acceptor 230, a currency dispenser 235 and a magnetic stripe reader and personal identification number (PIN) pad (MSR) 240. The computer 205 is shown in further detail in FIG. 3.

The cashier/customer display 210 may suitably include a flat panel touch screen LCD display or the like. The cashier/customer display 210 is used by the computer 205 to display information and receive input from both the cashier and the customer at different times during a financial transaction. During the financial transaction, the cashier/customer display 210 sits on the top of a counter 405 (FIG. 4) and is moved between a cashier position and a customer position. The cashier/customer display 210 may suitably move between the two positions by swiveling, rotating, flipping or turning. When the cashier/customer display 210 is positioned in the customer position, it faces the customer on the customer side 415 (FIG. 4) of the counter 405 and the computer 205 provides information to the customer and receives information from the customer related to a financial transaction requested by the customer. At a point during the financial transaction, the cashier/customer display 210 is moved to the cashier position where it faces the cashier on the cashier side 410 (FIG. 4) of the counter 405. After the computer 205 identifies the cashier, the computer 205 displays information and receives information from the cashier regarding the financial transaction started by the customer. If the cashier approves the financial transaction, the computer 205 processes the requested financial transaction.

Figure 4:
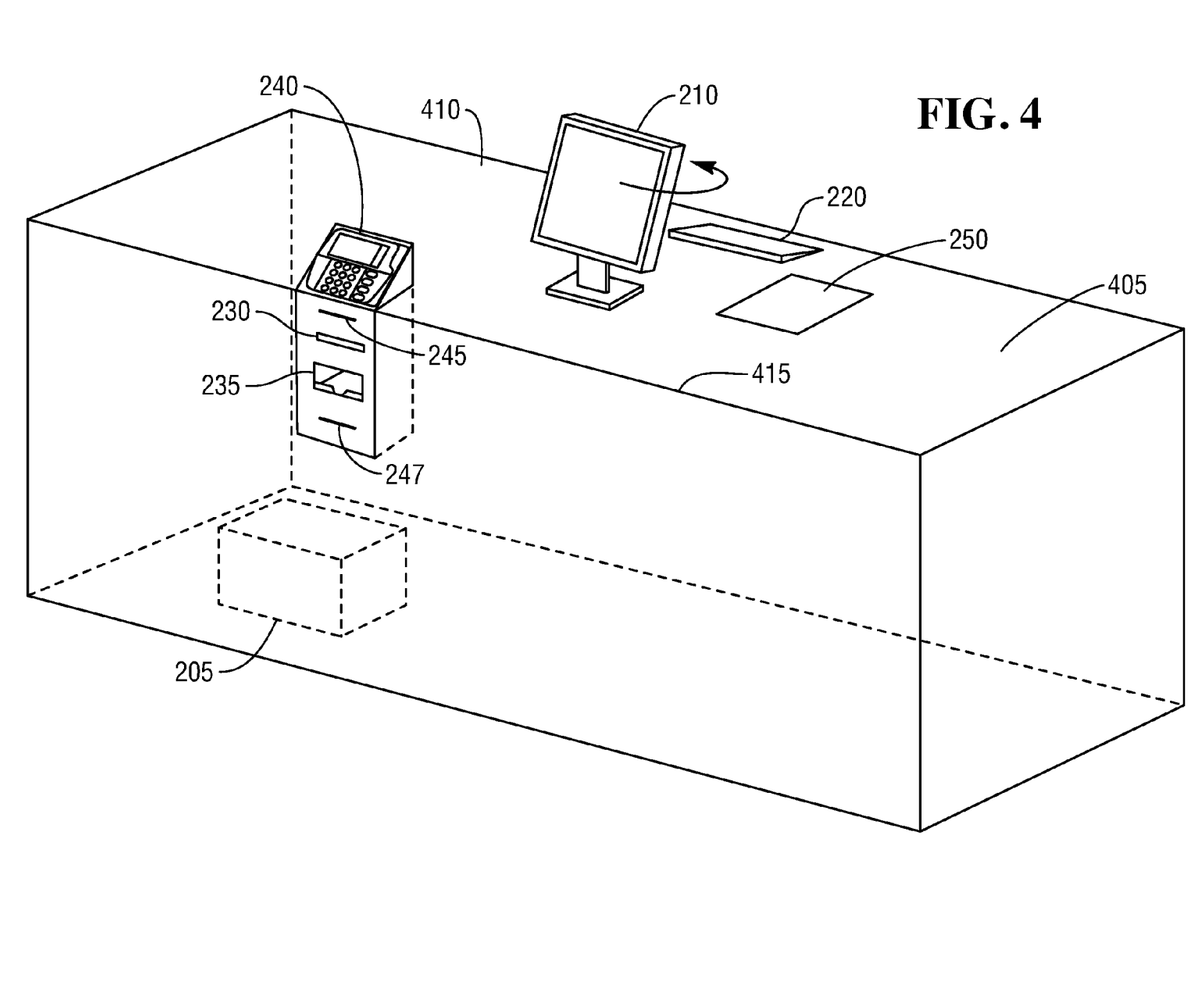
FIG. 4 is a high-level drawing illustrating one configuration of the financial services terminal.

Customers enter information by touching the screen of the cashier/customer display 210 to make selections provided by the computer 205 on the cashier/customer display 210. Cashiers may enter information by touching the screen of the cashier/customer display 210 and by using the keyboard 220 which is located on the cashier side 410 of a counter 405. The cash drawer 255 may suitably be used by the cashier during a financial transaction. The cash drawer 255 is used to store currency received from a customer as part of a financial transaction and to retrieve currency that is delivered to a customer as part of a financial transaction. The cash drawer 255 is located on the cashier side 410 of the counter 405 and the computer 205 will only open the drawer when the cashier is present as part of a financial transaction.

The scanner 250 is located within the top surface of the counter 405 (FIG. 4) and is preferably used by the cashier but may also be used by the customer. The scanner 250 reads optical codes presented to the scanner 250 for reading. The scanner 250 uses image scanning technology to read optical codes. The scanner 250 reads optical codes that include 1D and 2D bar codes and the like. The scanner 250 also captures images of items placed on the scanner 250 such as a driver's license, other forms of government identification and the like. In some embodiments, the scanner 250 includes laser scanning technology in addition to the image scanning technology, to read optical codes. In other embodiments, a second handheld optical code reader is provided. In still other embodiments, the scanner 250 is a handheld optical code reader instead of the fixed scanner. In some embodiments, the scanner 250 includes a weigh scale that weighs items placed on the scanner 250. The weight of an item is transmitted to the computer 205.

The receipt printer 245 is preferably located on the customer side 415 (FIG. 4) of the counter 405 (FIG. 4) and is used to print receipts and some documents related to a financial service requested by the customer. The money order printer 247 is preferably located on the customer side 415 of the counter 405 and is used to print money orders as part of a financial service requested by the customer. The currency acceptor 230 is preferably located on the customer side 415 of the counter 405 and accepts currency from a customer as part of the financial transaction. The currency acceptor 230 identifies each currency note received and transmits the information to the computer 205. Currency notes that cannot be identified are rejected and returned to the customer. The currency dispenser 235 is preferably located on the customer side 415 of the counter 405 and at the direction of the computer 205 dispenses a specified amount of currency to the customer as part of the financial transaction. In some embodiments, the currency dispenser 235 dispenses currency notes received by the currency acceptor 230. This is known as currency recycling and it increases the time between currency replenishment operations which reduce the cost of ownership.

The MSR device 240 is preferably located on the customer side 415 of the counter 405. The MSR device 240 reads information stored on a magnetic stripe located on the back of a card such as a credit, debit or loyalty card or the like. In some embodiments, the MSR device 240 reads information from chip cards that have information stored in an electronic digital chip located within a chip card. The MSR device 240 may suitably read information from chip cards using contactless or contact technology. Both magnetic stripe and chip cards may require the customer to enter a personal identification number and this is preferably accomplished using a pin pad integrated into the MSR device 240. The MSR device 240 transmits information it reads from cards and the pin pad to the computer 205. In some embodiments, the computer 205 can display information on a display that is part of the MSR device 240.

Figure 2B:
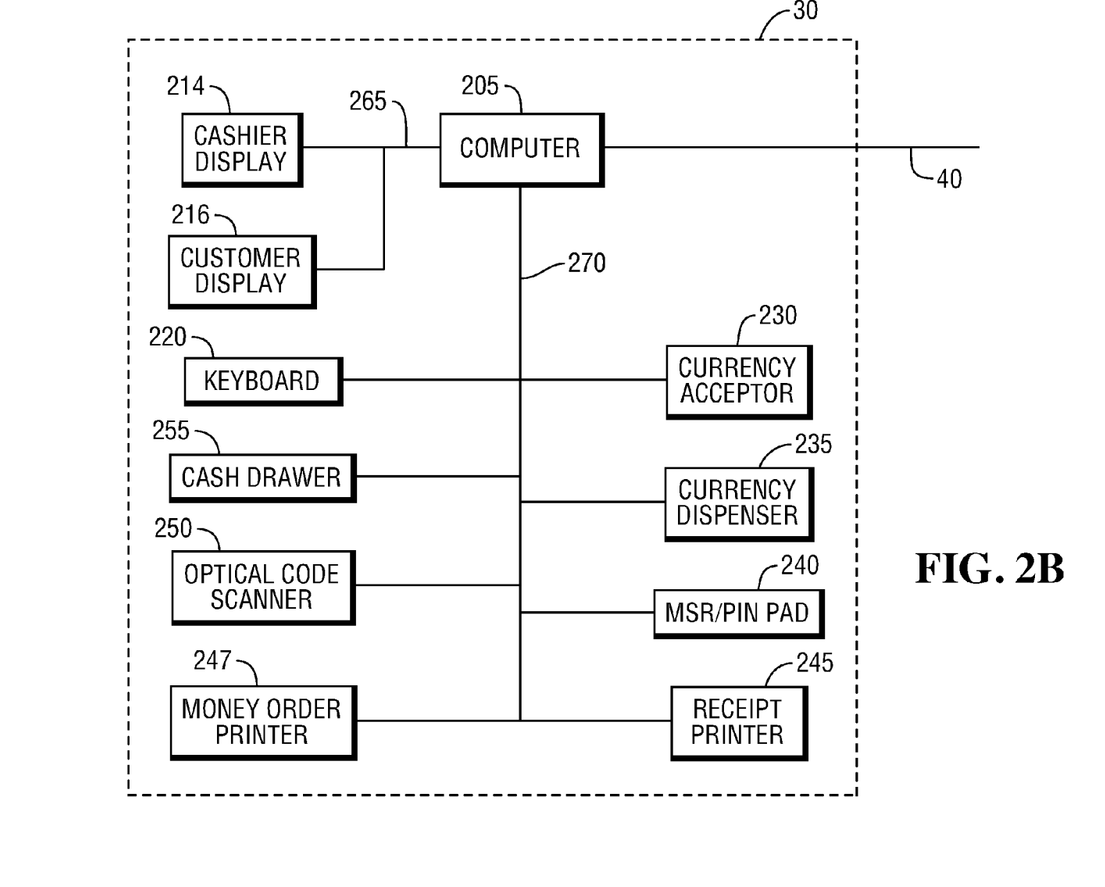
FIG. 2B is a high-level block diagram illustrating selected hardware components of another embodiment of the financial services terminal.

Turning now to FIG. 2B, there is provided a high-level block diagram illustrating selected hardware components of another embodiment of the financial services terminal 30. In this embodiment, the financial services terminal 30 includes two separate displays instead of the single cashier/customer display 210 that is shared between the cashier and customer. The financial services terminal 30 includes a cashier display 214 and a customer display 216. The cashier display 214 is preferably stationary on top of the counter 405 in the cashier position where it faces the cashier side 410 of the counter 405. The customer display 216 is preferably stationary on the top of the counter 405 in the customer position where it faces the customer side 415 of the counter 405. The cashier and the customer are preferably located on opposite sides of a counter 405. The computer 205 controls both displays 214, 216 including receiving touch screen input data from both displays 214, 216.

If the financial services terminal 30 described in FIG. 2A is upgraded to the financial services terminal 30 of this embodiment, only one new display is added. The original cashier/customer display 210 is reassigned to be either a casher display 214 or a customer display 216 and the new display is assigned to be the other display.

Figure 2C:
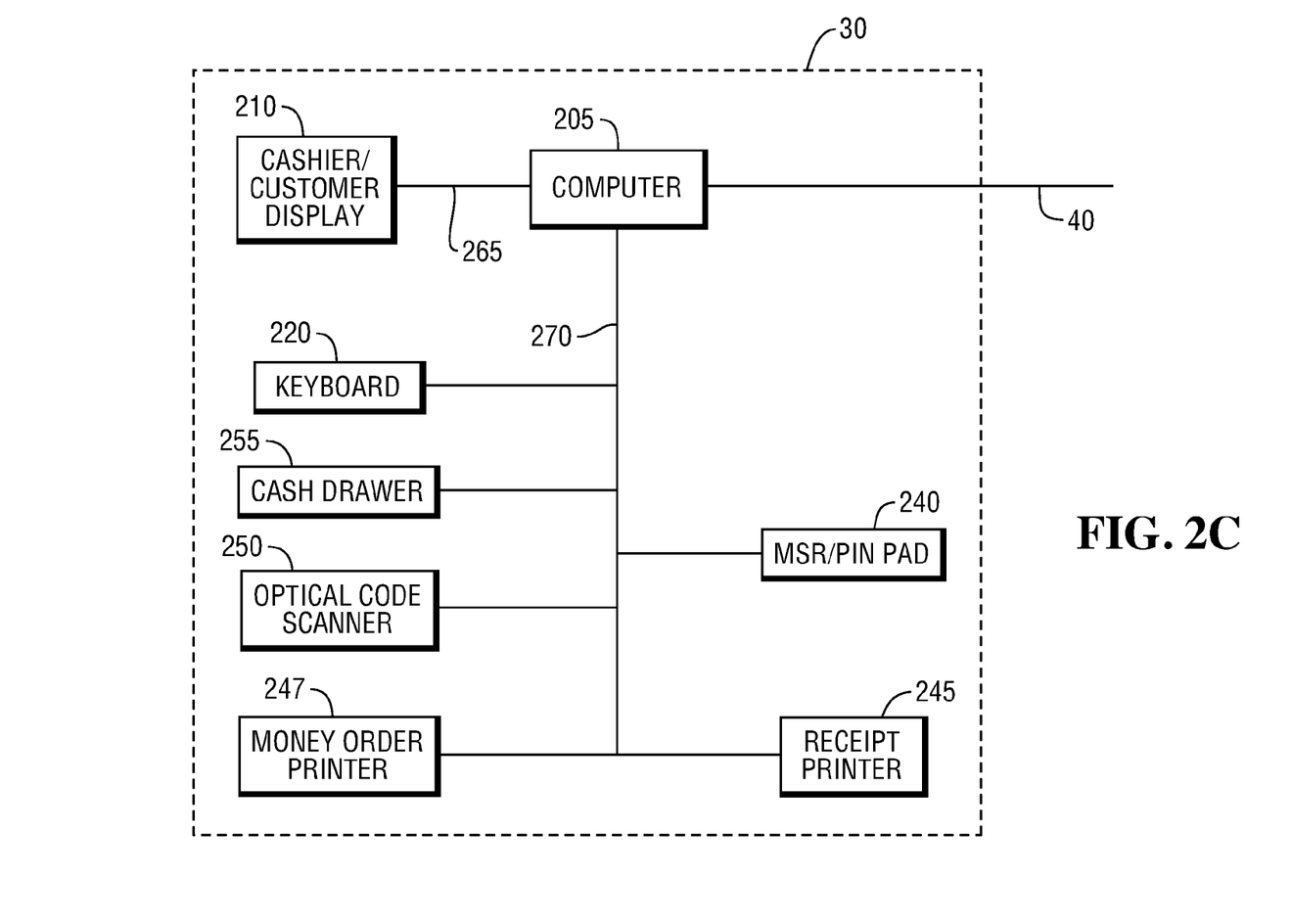
FIG. 2C is a high-level block diagram illustrating selected hardware components of another embodiment of the financial services terminal.

Turning now to FIG. 2C, there is provided a high-level block diagram illustrating selected hardware components of another embodiment of the financial services terminal 30. In this embodiment, the financial services terminal 30 includes the shared cashier/customer display 210 but the currency acceptor 230 and the currency dispenser 235 are not included. The cashier performs all currency functions using the cash drawer 255 after receiving instructions from the computer 205 on the cashier/customer display 210. The cashier stores currency received from the customer in the cash drawer 255 and delivers currency to the customer that is retrieved from the cash drawer 255.

Figure 3:
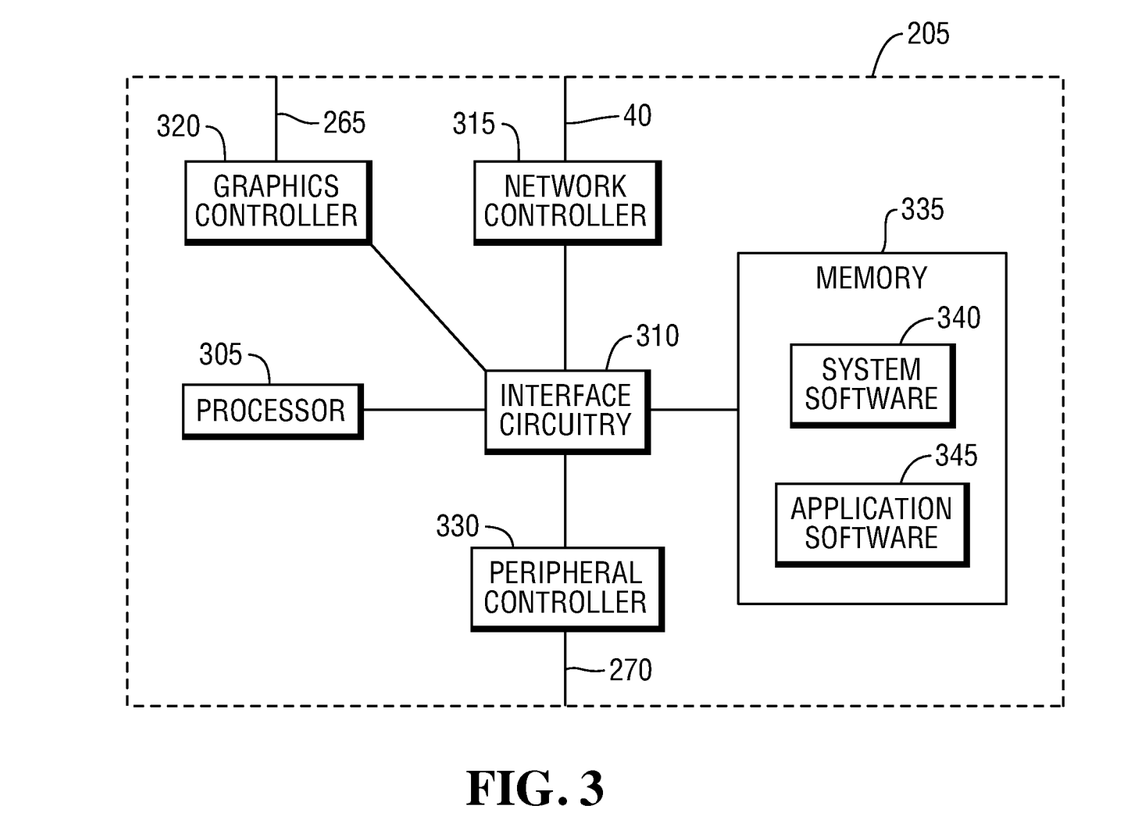
FIG. 3 is a high-level block diagram illustrating selected hardware and software components of an embodiment of a computer used in the financial services terminal.

With reference to FIG. 3, there is provided a high-level block diagram illustrating selected hardware and software components of an embodiment of the computer 205. The computer 205 may suitably include a personal computer that includes a processor 305, interface circuitry 310, a memory 335, a network controller 315, a graphics controller 320 and a peripheral controller 330. The processor 305 may suitably include one or more processors and the processors may suitably include multiple processor cores. The processor 305 communicates with the other components of the computer 205 using the interface circuitry 310.

The memory 335 uses non-transitory storage devices including both volatile and non-volatile memory. The non-volatile memory may suitably include flash memory, other types of solid state electronic memory and rotating storage devices, such as disk drives or the like. Non-volatile memory retains stored information after power is removed from the memory and until power is restored. Computer instructions stored in the memory 335 are executed by the processor 305. The computer instructions include system software 340 and application software 345. When the processor 305 executes the computer instructions, the computer instructions cause the processor 305 to control the devices, components and peripherals either within or attached to the computer 205 and to provide the services and functions provided by the financial services terminal 30. When reference is made to the computer 205 performing or providing a function or action, it is the processor 305 within the computer 205 executing the computer instructions stored within the memory 335 that performs the function or action.

The system software 340 may suitably include an operating system provided by Microsoft™, Linux™, Apple™ or others. The application software 345 includes functions that display financial transaction screens on and receives input from one or more displays 210, 214, 216 which may suitably be attached to the computer 205. These financial transaction screens guide the customer and the cashier through the financial transaction including providing a list of financial transactions that are available to the customer and starting a financial transaction requested by the customer. In some embodiments, the cashier will request to start a financial transaction for a customer and then enter the basic information for the customer using the touch screen display (210 or 214) and the keyboard 220.

The network controller 315 connects the computer 205 to the network 25 over a network connection 40. The network controller 315 allows the computer 205 to communicate information with the computers or devices connected to the network 25. The graphic controller 320 supports one or more computer displays, such as the cashier/customer display 210 or the cashier display 214 and the customer display 216 over one or more connections 265. In addition, each display 210, 214, 216 may suitably include a touch screen device that is overlaid on the surface of the active display and identifies the location of a touch to the device. The computer 205 receives information on each touch from the touch screen device. The touch information is then processed by application software 345 as input. The peripheral controller 330 may preferably include a Universal Serial Bus (USB) 270 that is used to communicate with each of the peripherals attached to the computer 205. The USB 270 connection to each peripheral may suitably include independent buses to each of the peripherals or a common bus between all of the peripherals. In some embodiments, the USB 270 provides power to a connected peripheral in addition to communications.

FIG. 4 provides a high-level drawing illustrating a configuration of one embodiment of the financial services terminal 30. This embodiment represents only one possible implementation of the financial services terminal 30 and the physical relationship between the customer and cashier to the peripherals of the financial services terminal 30. The financial services terminal 30 is preferably implemented within a customer service counter 405. In this embodiment, the counter 405 is located within a retail store and is separate from the checkout terminal used to perform a purchase transaction. The customer service counter 405 is generally staffed when the store is open for business. The counter 405 preferably includes the cashier side 410 and the customer side 415. Access to the cashier side 410 of the counter 405 is preferably restricted to employees of the store.

It should be noted that the cashier receives training specific to the services offered by the financial services terminal 30. The training includes information about government statutes and rules and polices implemented by the store related to the services offered. The cashier uses this information when reviewing a financial transaction to determine if the transaction should be allowed or denied. Some financial transactions require the customer to present additional documents, such as identification documents, to the cashier. In some embodiments, the cashier uses the scanner 250 to capture an image of each of the documents which are then stored with other information related to the transaction. Not all financial transactions are required to be reviewed by the cashier. Certain financial transactions that involve monetary values that fall below predetermined limits may suitably be completed by the financial services terminals 30 without being approved by the cashier. However, some companies have policies that require the cashier to approve all financial transactions.

All financial transactions offered by the financial services terminal 30 preferably include a fee for performing each financial transaction. The fee is charged by the store that provides the financial services terminal 30. The fee is classified as a service provided by the store to the customer and is processed as an item in a purchase transaction for the customer. The financial services terminal 30 processes the purchase transaction as a separate operation from the financial transaction. However, the financial services terminal 30 controls and coordinates both the purchase transaction and the financial transaction. Preferably the financial transaction is not completed until it is approved by the cashier and the purchase transaction including the fee for the financial transaction has been processed. For example during tax time, the fee for cashing a government refund check could be waived.

The financial services terminal 30 communicates transaction information about each financial transaction and purchase transaction to the POS store server computer 15. The transaction information includes but is not limited to: the time and date of the transaction, the type of transaction performed, the amount of each transaction, the parties in the transaction, the items identified within each transaction, the amount of money received from the customer both physically and electronically, and the amount of money tendered to the customer both physically and electronically. The POS store server computer 15 uses the transaction information to balance the cash drawer 255 of the financial services terminal 30 and to keep a general ledger of accounts for the store. The POS store server computer 15 additionally maintains detailed information related to each executed financial transaction that is required by the government, general rules of accounting or by company policy.

Financial services that involve the transfer of money are governed by one or more of state, federal or international laws and regulations. Financial services governed by these laws include money transfers, money orders, gift cards and other types of non-traceable products. Most of the laws and regulations were established to combat money laundering and to enhance national security. The Financial Crimes Enforcement Network (FinCEN), an agency of the United States Department of the Treasury, is one of the agencies tasked with enforcing the United States laws related to money transfers. These laws set rules that govern most aspects of money transfers and violations of the rules can lead to civil and/or criminal penalties against the parties including the party providing the money transfer service. Because the penalties for violating these laws are so severe, companies that provide money transfers and other related services mandate that an employee, trained in money transfer law, reviews and approves most if not all money transfers. The trained employee may suitably include a cashier that is further trained to provide financial services to customers.

Third parties that provide a financial service, for example MoneyGram® which provides a money order service, also are governed by the same laws and regulations regarding money transfers. As such, third parties track customers that are requesting to transfer money and will impose their own restrictions. The following is one example of how a third party may conduct a transaction. When a customer requests a money order, the customer provides basic information such as the amount of the money order and some form of identification. If the cashier approves the transaction, the information is sent to the third party's external server computers 25 for processing by the financial services terminal 30. The third party may determine that the customer has received another money order from different retailer within the last 24 hours. This money order was unknown to the current retailer and therefore it could not be used to determine if any laws, regulations or policies are being violated with the current request. The third party then sends information to the cashier requesting additional information and may preferably notify the cashier of the prior money order. Depending on the specific circumstances, the cashier may approve the current money order after receiving further information from the customer or the cashier may deny the request for a money order and cause the financial services terminal 30 to terminate the request to the third party. In some cases, the third party will deny the request.

Some types of customer requested financial transactions have a monetary value that is so far below thresholds set by money transfer law that software can determine that no approval is required. Transactions performed by an automatic teller machine are designed to fall into the category of transactions that do not require approval. Other customer requested financial transactions may also have monetary values that fall below legal thresholds, but other aspects of the transactions could violate the law and thus require review and approval by a trained employee.

The financial services terminal 30 is a special purpose terminal that performs financial transactions requested by a customer or a cashier for a customer. The financial services terminal 30 further performs purchase transactions for the customer that includes a fee for any financial transactions performed. Financial transactions require information to setup a financial transaction prior to being able to process the financial transaction. The customer is typically able to and is best suited to enter this information at the direction of the financial services terminal 30 without any assistance from a cashier. After the information has been entered, the cashier is called to review and approve the financial transaction. In some cases the cashier may require additional information from the customer or require a modification to one or more parameters of the requested financial transaction. For example, the amount of money to be transferred might exceed legal limits or company policy so the amount has to be reduced before the financial transaction can be approved.

A financial transaction fee is typically charged for each type of financial transaction. The customer is required to pay the fee as part of a separate purchase transaction also performed by the financial services terminal 30. The financial services terminal 30 reports information about each financial transaction and purchase transaction to the POS store server computer 15. The POS store server computer 15 maintains this information and uses it to balance the money in the financial services terminal 30 and for the store's general ledger that includes information about each financial transaction. The information about each financial transaction includes the amount of money transferred, the parties involved in the transaction, the time and date of the transaction, an electronic image of any required documents that were scanned by the financial services terminal 30 and the fee paid by the customer.

Figure 5:
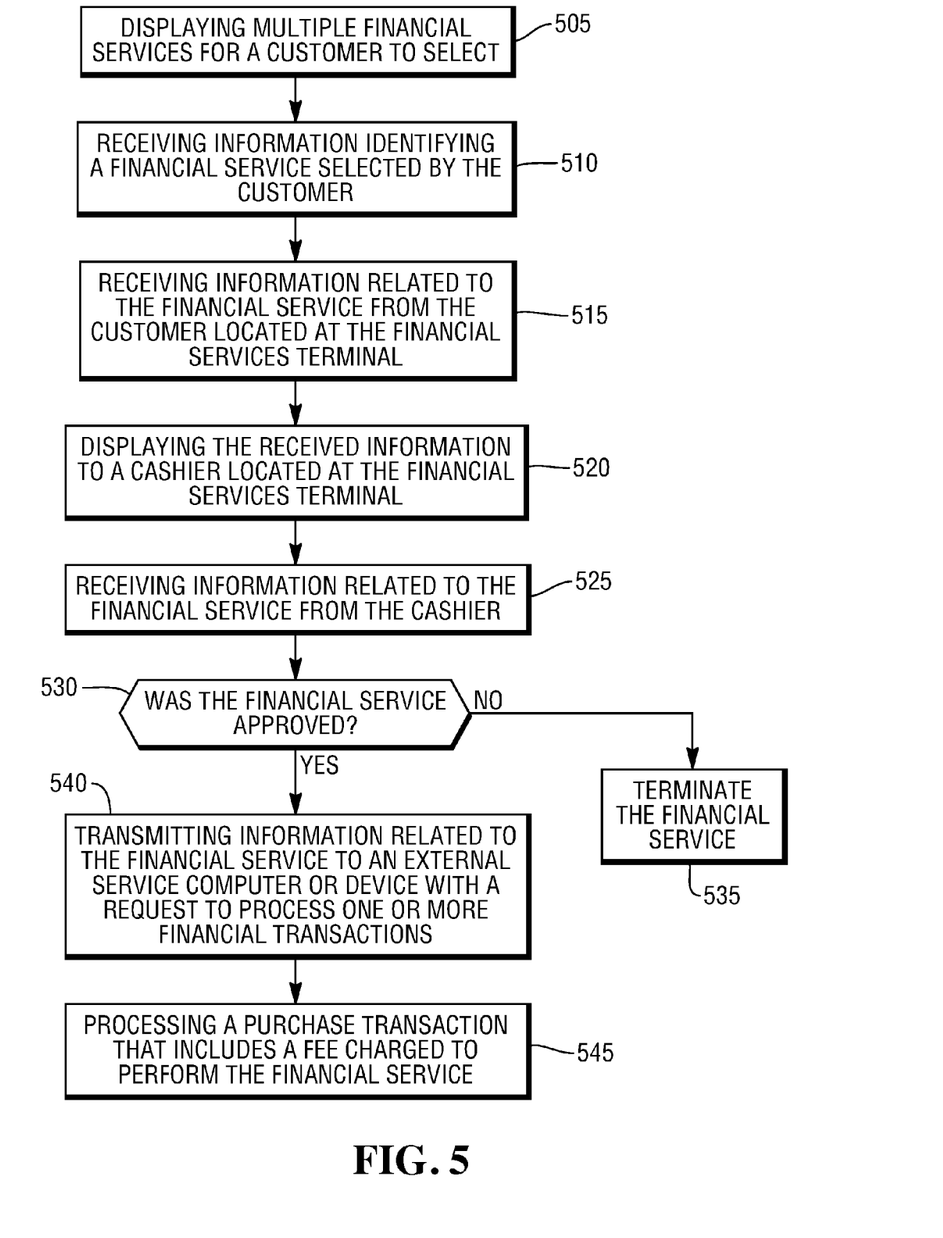
FIG. 5 is a high-level flow diagram illustrating a method of operating the financial services terminal.

Turning to FIG. 5, there is provided a high-level flow diagram illustrating a method 500 of operating the financial services terminal 30. The following method describes one embodiment of the financial services terminal 30 and one example method for operating it.

In step 505, the processor 305 displays multiple financial services provided by the financial services terminal 30 and that are available for a customer to select. Each of the financial services has one or more financial transactions associated with it. The processor 305 displays the multiple financial services on the display 210 or 216 that is accessible by the customer. For embodiments that use only the cashier/customer display 210, the multiple financial services are displayed on the cashier/customer display 210 which is positioned in the customer position facing the customer side 415 of the counter 405. For embodiments that use both the cashier display 214 and the customer display 416, the multiple financial transactions are displayed on the customer display 416. The listing of the multiple financial transactions may suitably be the default screen that is displayed whenever the financial services terminal 30 is waiting for a customer.

The financial services terminal 30 can perform a plurality of different types of financial services. These transaction types include but are not limited to: automatic teller machine transactions, money transfer transactions, bill payment transactions, check cashing transactions, pre-paid phone card transactions, gift card transactions, check cashing and money order transactions. A fee is preferably charged for each type of service. The actual fee that is charged for a financial service will typically vary between different retailers and can vary for the same retailer in different regions or countries.

In step 510, the processor 305 receives information identifying a financial service selected by the customer. The customer selects the financial service by touching the appropriate location on either the customer display 216 or the cashier/customer display 210, whichever is present. Using the identifying information, the processor 305 selects and executes an application within the application software 345 that is designed to perform the identified financial service selected by the customer. The selected application generates transaction screens for the selected financial service and displays them on the appropriate customer display.

In step 515, the processor 305 receives information related to the selected financial service from the customer. In response to the transaction screens generated and displayed in step 510, the customer is requested to enter information needed to perform the selected financial service. The customer uses the touch screen interface of either the customer display 216 or the cashier/customer display 210, whichever is present, to enter the information.

In step 520, the processor 305 displays the information received from the customer related to the financial service to a cashier located at the financial services terminal 30. If the financial services terminal 30 is using the shared cashier/customer display 210, the processor 305 signals the cashier to move the cashier/customer display 210 from the customer position which faces the customer to the cashier position which faces the cashier. The processor 305 may suitably signal the cashier to move the cashier/customer display 210 using an audible signal or a signal sent to a portable handheld device used by the cashier, such as a smart cellular phone. If the financial services terminal 30 includes the cashier display 216, the processor 305 simply signals the cashier for assistance. The processor 305 then requires the cashier to login or provide some type of identification. Once the cashier has been authenticated, the processor 305 displays the information received from the customer so the cashier can review the requested financial service. In some cases, the cashier will require additional information from the customer such as an identification document. The processor 305 may also require the cashier to place a required document on the scanner 250 where an image of the document is captured. For some financial services, the processor 305 will highlight exceptions in the information for the financial service on the cashier's display 210 or 214. The exceptions identify information that is missing, incomplete or violates laws, rules or policies. The cashier can query the customer for additional information and update the information for the financial transaction to eliminate the exceptions.

For example, if the amount of money to be transferred in a money transfer service is higher than an established limit, the cashier may explain the limitation to the customer and the customer may decide to lower the amount to or below the limit. The cashier then modifies the information for the financial transaction. If there are no other exceptions and the cashier is satisfied that all laws, rules and policies have been complied with, the cashier will then approve the transaction. If any exceptions remain or if the cashier believes a law, rule or policy has been violated, the cashier will deny the transaction and the financial service is terminated.

In step 525, the processor 305 receives information related to the financial service from the cashier. The information includes an approval from the cashier to complete the financial transaction or a rejection from the cashier which terminates the financial transaction.

In step 530, the processor 305 determines if the cashier has approved the financial transaction. If the financial transaction has been approved by the cashier, control passes to step 540. If the financial transaction has been rejected by the cashier, control passes to step 535 where the financial service is terminated.

In step 540, the processor 305 transmits the information related to the approved financial service to an external server computer 25 or device 20 with a request to process one or more financial transactions. The external server computer is determined based on the financial service that has been requested by the customer. By way of example, if the financial service is an automatic teller machine (ATM) function, the financial service information is sent to the automatic teller machine switch 20 for delivery to a financial ATM server computer that will process the ATM functions. In this example, the customer has already been instructed to and has swiped their ATM card and entered their personal identification number (PIN) using the MSR device 240 and this information is included in the information initially sent to the financial ATM server computer. Once the customer is authenticated by the financial ATM server computer, the financial ATM server computer establishes an interactive secure ATM session with the customer. The ATM session requires the processor 305 to receive screen information to be displayed on the customer's display, display the screen on the customer's display, receive input from the customer and transmit the input to the financial ATM server computer. This cycle is repeated until the ATM session is closed.

When the financial service is a request to pay a bill to a company, the customer enters information that identifies the company and their account with the company and provides payment to the financial services terminal 30. This information is transmitted to the external server computer 25 that processes bill payments for the identified company. In a typical transaction of this type, no further interaction with the customer is required to process the bill payment. The external server computer 25 simply responds with a secure token that includes status of the transaction, such as successful or failed with a reason. The status information is then displayed to the customer and the cashier. In some embodiments, a check for the amount specified by the customer is generated and mailed to the identified company as payment of the bill. In other embodiments, an electronic payment is made directly to a predetermined account for the company and identified as a payment for the account identified by the customer.

The application executed by the processor 305 that processes each type of financial service determines which external server computer 25 or device 20 to communicate with to process the financial service requested by the customer. The application further provides whatever information or interface with the customer that is required to complete the financial service.

In step 545, the processor 305 processes a purchase transaction that includes a fee for the financial services requested and performed for the customer. The customer completes the purchase transaction by providing the proper payment. In some embodiments, this step is performed prior to completing the financial transaction.

Although the present invention has been described with particular reference to certain preferred embodiments thereof, variations and modifications of the present invention can be effected within the spirit and scope of the following claims. For example, the financial services terminal 30 maybe used within a banking environment to provide the same or similar financial services described herein.

What is claimed is:

1. A method for processing a financial transaction and a purchase transaction, the method implemented as executable instructions within a non-transitory computer-readable storage medium and executed by a financial services terminal, the method comprising:

receiving, by a financial services terminal, information related to the financial transaction from the customer located at the financial services terminal, the information includes identifying the financial transaction as being related to financial services desired by the customer and as being unrelated to a purchase transaction being performed by the customer for the purchase of an item at the financial services terminal;

sending a signal, by a processor of the financial services terminal to a portable device used by the cashier upon indication of the use of a shared display being operated by the customer through a customer side of the financial services terminal;

displaying, by the financial services terminal, the received information on a display of the financial services terminal to the cashier located at the financial services terminal;

receiving, by the financial service terminal, information related to the financial transaction from the cashier located at the financial services terminal;

in response to receiving the information from the cashier, determining, by the financial services terminal, a third party external server to transmit the information based on the financial services desired by the customer;

transmitting, by the financial services terminal information related to the financial transaction to the determined external financial server computer with a request to process the financial transaction, receiving a reply from the determined external financial server computer including a request for additional information related to the financial transaction, receiving input within the financial services terminal with regard to the additional information requested, transmitting the received additional information to the determined external financial server computer, processing, by the financial services terminal, the purchase transaction for the customer that includes a fee charged to perform the financial transaction and processing, by the financial services terminal, the purchase transaction as a separate operation from the financial transaction, and controlling and coordinating, by the financial services terminal both the purchase transaction and the financial transaction; and communicating, by the financial services terminal, information relevant to the purchase transaction and the financial transaction to a store server and balancing, by the store server, cash held in a drawer of the financial services terminal relevant to the financial transaction based on the information and maintaining, by the store server, a general ledger of accounts for the store in which the financial services terminal is located and the general ledger relevant to the purchase transaction and the fee based on the information.

2. The method of claim 1, wherein receiving information from the cashier includes receiving an approval to process the financial transaction.

3. The method of claim 1, further comprising receiving an acknowledgment from the external server computer that the financial transaction was successful.

4. The method of claim 1, wherein the external financial server computer is accessed through an automatic teller machine switch and the financial transaction is a request to perform an ATM function.

5. The method of claim 1, wherein the external financial server computer processes payments for bills and the financial transaction is a request to pay a bill.

6. The method of claim 1, wherein the financial transaction is a request to issue a money order.

7. The method of claim 1, wherein at least a portion of the information received from the customer and from the cashier is received from a shared touch screen display that is used by the customer when the touch screen display is positioned in a customer position and is used by the cashier when the touch screen display is positioned in a cashier position.

8. The method of claim 1, wherein at least a portion of the information received from the customer is received from a customer touch screen display positioned in a customer position and at least a portion of the information received from the cashier is received from a cashier touch screen display positioned in a cashier position.

9. The method of claim 1, further comprising receiving currency from the customer.

10. The method of claim 1, further comprising receiving payment information from the customer.

11. The method of claim 1, further comprising dispensing currency to the customer.

12. A financial services terminal for processing a financial transaction and a purchase transaction within a store, the financial services terminal comprising:
a shareable touch screen display;
a plurality of peripherals;
a digital computer network; and
a computer including a processor in communication with the shareable touch screen display, the plurality of peripherals and the digital computer network, the computer further including computer instructions that when executed by the processor cause the processor to perform the following steps:
receive from the shareable touch screen display information related to the financial transaction from a customer when the customer is operating the financial services terminal;
sending a signal, by a processor of the financial services terminal to a portable device used by the cashier upon indication of the use of a shareable touch screen display being operated by the customer through a customer side of the financial services terminal;
display the received information to a cashier located at the financial services terminal, wherein the financial services terminal includes a customer side operated by the customer and a cashier side operated by the cashier;
receive information related to the financial transaction from the cashier when the cashier is operating the financial services terminal;
transmit, in response to receiving the information from the cashier, information related to the financial transaction to an external financial server computer with a request to process the financial transaction after first determining the external financial server based on the financial transaction of the customer;
receiving a reply from the external financial server computer including a request for additional information related to the financial transaction, receiving input within the financial services terminal with regard to the additional information requested, transmitting the received additional information to the external financial server computer, wherein the external financial server is a third party providing the financial services;
process a purchase transaction for the customer that includes a fee charged to perform the financial transaction and process the purchase transaction as a separate operation from the financial transaction for the purchase of an item being made by the customer, and control and coordinate both the purchase transaction and the financial transaction by the financial services terminal, wherein the financial transaction is relevant to financial services desired by the customer and unrelated to the purchase transaction; and
transmit information relevant to the purchase transaction and the financial transaction to a store server and balancing, by the store server, cash held in one of the peripherals based on the information and maintaining, by the store server, a general ledger of accounts for the store in which the financial services terminal is located and the general ledger relevant to the purchase transaction and the fee based on the information.

13. The financial services terminal of claim 12, further comprising a second touch screen display in communication with the computer.

14. The financial services terminal of claim 13, wherein displaying the received information to a cashier includes displaying the received information to a cashier on the second touch screen display and wherein receiving information from the cashier includes receiving information from the cashier using the second touch screen display.

15. The financial services terminal of claim 12, where the first touch screen display is movable between a customer position facing the customer and a cashier position facing the cashier.

16. The financial services terminal of claim 12, wherein the plurality of peripherals include a currency acceptor and a currency dispenser both accessible by the customer.

17. The financial services terminal of claim 12, wherein the plurality of peripherals include a cash drawer positioned to limit access to only the cashier.

18. The financial services terminal of claim 12, wherein the plurality of peripherals include an optical code scanner accessible by the cashier where the optical code scanner is adapted to capture an image of a customer document presented to the optical code scanner.

19. The financial services terminal of claim 12, wherein the plurality of peripherals include a magnetic stripe reader/PIN pad accessible by the customer.

20. The financial services terminal of claim 12, wherein the steps performed by the processor further comprising transmit financial and purchase transaction information to a point-of-sale server computer.

21. The financial services terminal of claim 12, wherein the plurality of peripherals include a money order printer accessible by the customer.

22. One or more non-transitory digital storage media storing instructions which, when executed by one or more computing devices, causes performance of the method recited in claim 1.

* * * * *